United States Patent [19]

Lussier

[11] 4,293,084

[45] Oct. 6, 1981

[54] DISPENSING CONTAINER WITH INGREDIENT LEVEL INDICIA

[76] Inventor: Claude Lussier, 2825 Place Darlington, Apt. 3, Montreal, Quebec, Canada

[21] Appl. No.: 88,374

[22] Filed: Oct. 26, 1979

[51] Int. Cl.³ .............................................. G01F 11/26
[52] U.S. Cl. ..................................... 222/158; 116/227; 215/365
[58] Field of Search .......................... 116/227; 73/427; 222/157, 158; 215/365

[56] References Cited

U.S. PATENT DOCUMENTS

| | | | |
|---|---|---|---|
| 2,514,744 | 7/1950 | Cipyak | 73/427 X |
| 3,028,983 | 4/1962 | Barr | 73/427 X |
| 4,021,943 | 5/1977 | McMullen | 73/290 R |
| 4,079,859 | 3/1978 | Jennings | 222/158 X |

*Primary Examiner*—Daniel M. Yasich

[57] ABSTRACT

A measuring container for pourable ingredients which comprises a body having relatively uniform transparent walls, a flat bottom wall and a top having a pourable opening, spaced apart graduated indicia located on the transparent walls with each indicia provided at the point of intersection of a plane coincident with the horizontal level of ingredients filling the container up to the said horizontal level when the flat bottom of the container is on a horizontal plane and a plane coincident with the pour level of the ingredients when the container is tilted at an angle such that the ingredients will pour from the pour opening.

1 Claim, 4 Drawing Figures

DISPENSING CONTAINER WITH INGREDIENT LEVEL INDICIA

BACKGROUND OF THE INVENTION

1. Field of the Invention

The present invention relates to a measuring device and particularly to containers for dispensing liquids or powdered goods having indicia for determining the volume remaining in the container.

2. Description of the Prior Art

There are many different types of containers today for dispensing liquids such as anti-freeze, concentrated liquid detergent, bleaching agents and various other concentrated chemical liquids used in the household wherein the exact volume being dispensed must be accurately controlled from the point of view of cost or from the point of view of getting the proper measure of liquid in a particular mixing formula.

There are many containers of this type on the market which are either cylindrical or oval in shape having a pour spout at the top thereof and which has volumetric indicia marked on the sidewalls of the container. The indicia is calibrated when the container is in an upright position that is with the bottom of the container on a flat plane. This indicia is accurate for measuring the liquid when the bottle or container is not in use. Thus, when one is pouring a liquid from the container through the pour spout, the container is no longer in an upright position but is tilted or tipped to allow a proper flow of the liquid through the pour spout. As the container gradually empties the container must be tilted to a much greater angle from its original upright position. While one is pouring the liquid, there is no indication of the remaining volume in the bottle and and therefore one must continually guess as to what the approximate amount is that is being poured or intermittently set the container down on a flat surface to accurately determine what is remaining in the container.

The above state of the art is confirmed by U.S. Pat. No. 3,948,105 Johnson Jr., Apr. 6, 1976. In that patent a proportioning and mixing container having two sections is shown. Graduations are provided on both sections of the container and these graduations are all calibrated when container is in an upright unused position. Other U.S. Patents such as U.S. Pat. No. 3,530,722 Miller, Sept. 29, 1970 and U.S. Pat. No. 4,079,629 Hope, Mar. 21, 1978 merely confirm the state of the prior art indicated above.

SUMMARY OF THE INVENTION

It is an aim of the present invention to provide indicia on a container in such a way that the remaining volume in the container can be determined even while the container is tipped and the liquid is being poured from the poring spout.

It is a further aim of the present invention to provide a container for pouring liquids or powdered ingredients which has indicia provided on the container for measuring the volume remaining in the container both when the container is in its upright position with the bottom thereof on a horizontal plane or when the container is being tipped in a pouring situation.

A construction in accordance with the present invention includes a container for pourable ingredients comprising a body having relatively transparent walls uniform, a flat bottom wall and a top having a pouring opening. Spaced apart, graduated indicia are located on the transparent walls, each indicia provided at the point of intersection of a plane coincident with the horizontal level of ingredients filling the container up to said horizontal level when the flat bottom of the container is in a horizontal plane, and a plane coincident with the pour level of the ingredients when the container is tilted at an angle such that the ingredients will pour from the pour opening.

Accordingly, it will be seen that a container having a pour spout on the top portion of the container will when the container is in a pouring attitude, indicate the remaining volume in the container by viewing the pour level of the ingredients which is the liquid or powder and matching that level with the closest indicia point.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENT

Figures 3, 4:
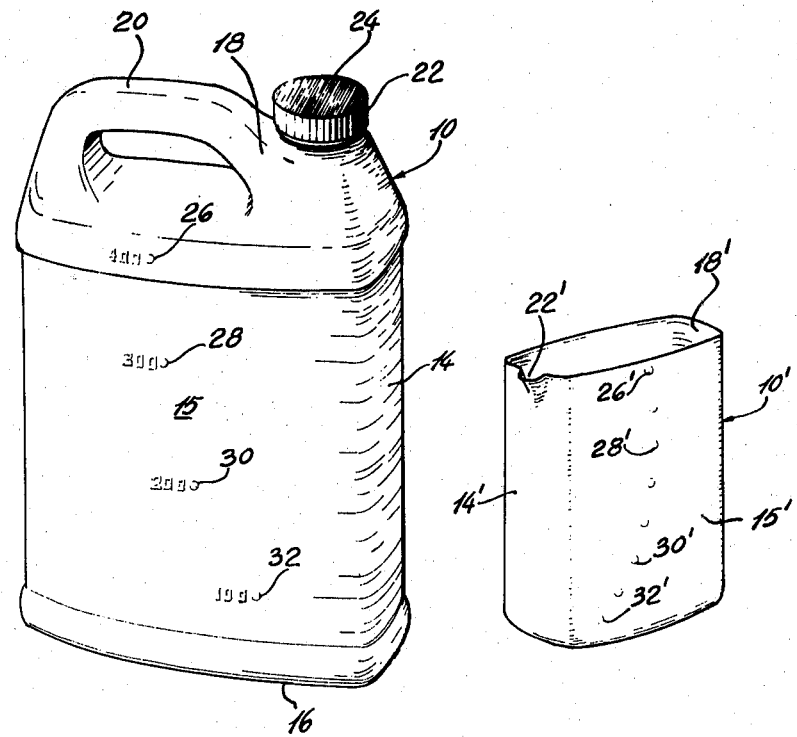
FIG. 3 is a perspective view of another shape of container having the indicia of the present invention.
FIG. 4 is a perspective view of still a further embodiment provided with the indicia of the present invention.

Referring now to the drawings, FIG. 3 shows a typical container of the flat or narrow variety containing four liters or 400 cubic centimeters. The container 10 has sidewalls 15 and endwalls 14 with a bottom wall 16. The top 18 of the container 10 has a handle 20 and a pour spout 22 with a cap 24. It is possible to have a flattened or narrow container straight up standing sidewall 15 and a pour spout 22 near one end at the top 18. A cap 24 is provided on the pour spout 22.

Dots 26, 28, 30 and 32 are provided on the sidewalls 15 of the container 10. These dots are calculated and calibrated according to the volume remaining in the container at a particular level when the container 10 is flat that is the bottom 16 is on a horizontal surface and when the container is tilted with the pour spout tilting downwardly to pour the liquid from the container 10. The individual dots 26, 28, 30 and 32 are located at the intersections of these two levels for a given volume.

Figures 1, 2:
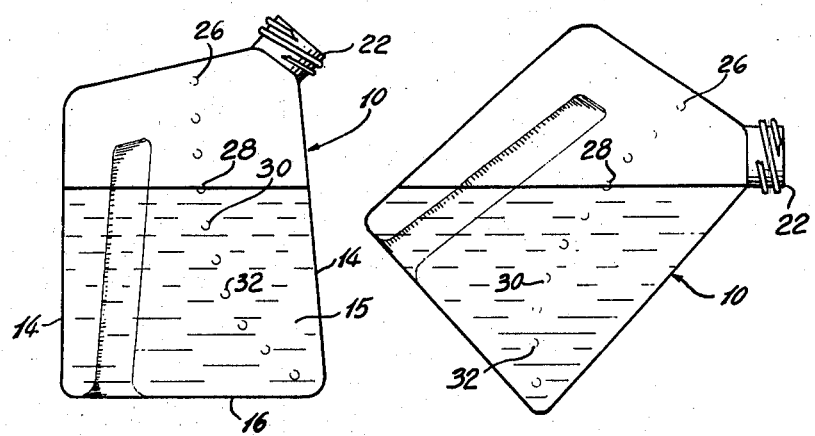
FIG. 1 is a schematic view of a typical container in accordance with the present invention.
FIG. 2 is a schematic illustration of the container shown in FIG. 1 in a different operative position.

FIGS. 1 and 2, show schematically what has been described above. In FIG. 1, the container illustrated has a different shape and that of FIG. 3 but since no undue confusion would be present, the same numerals are used to identify similar components. The container 10 shown in FIGS. 1 and 2 is likewise, a flattened or narrow container with two sidewalls 15 and end walls 14.

The container 10 in FIG. 1 is shown as being transparent and the level of the liquid in the container has been exaggerated in order to illustrate schematically the point of the present invention. In FIG. 1, the container is shown with the bottom wall 16 in a flat horizontal plane. The level of liquid is shown at a dot 28. The dot 28 indicates the remaining volume of the liquid in the container when the level is at dot 28. When the container 10 is tipped as shown in FIG. 2 to allow the liquid to be poured from the pour spout 22, the level of the liquid will remain at the dot 28, since the dot 28 is at the intersection of these two levels. It is also possible to draw elongated lines intersecting at these dots so that a more approximate estimate can be made of the level of the liquid when the liquid level is between indicia dots.

The actual locus or series of points drawn through the dots will vary depending on the form of the container. In this case, the locus appears to be a portion of an ellipse while in a more cylindrical container the locus might be a different geometric curve.

The embodiment shown in FIG. 4 includes an opened top pitcher 10' having sidewalls 15' and endwalls 14' with an opened top 18'. A spout 22' is provided at the top of wall 14'. A series of points or dots 26', 28', 30' and 32' are provided on the wall 15' and function similarly to the dots described with respect to FIGS. 1 to 3.

I claim:

1. A dispensing and volume-measuring container for pourable ingredients comprising a body having relatively uniform, light-permeable sidewalls, a bottom wall and a top having a free-pouring open spout, a single series of dual-functioning calibrated separate indicia on at least one of the sidewalls which always indicate the volume of pourable ingredients in relation to the level of the ingredients in said container, said single series of indicia being arranged so that the plane of the horizontal level of said ingredients at a given volume always passes through a common point of intersection in the series of indicia at any position of the container when the container is moved between an upright and the pouring positions of the container.

* * * * *